United States Patent [19]

Saegusa

[11] Patent Number: 4,589,756
[45] Date of Patent: May 20, 1986

[54] METHOD AND APPARATUS FOR THE AUTOMATIC CONTROL OF EXPOSURE IN CAMERA

[75] Inventor: Takashi Saegusa, Kawasaki, Japan

[73] Assignee: Nippon Kogaku K. K., Tokyo, Japan

[21] Appl. No.: 650,852

[22] Filed: Sep. 14, 1984

[30] Foreign Application Priority Data

Sep. 20, 1983 [JP] Japan ................................ 58-173665

[51] Int. Cl.$^4$ .................... G03B 7/28; G03B 7/08
[52] U.S. Cl. .................... 354/432; 354/443; 354/448
[58] Field of Search ............... 354/429, 430, 431, 432, 354/443, 448

[56] References Cited

U.S. PATENT DOCUMENTS

| | | | |
|---|---|---|---|
| 3,717,077 | 2/1973 | Harvey | 354/432 |
| 3,896,472 | 7/1975 | Yoshiyama et al. | 354/443 |
| 4,196,989 | 4/1980 | Toyoda et al. | 354/443 |
| 4,214,826 | 7/1980 | Uchida et al. | 354/432 |
| 4,443,080 | 4/1984 | Saegusa | 354/432 |
| 4,448,506 | 5/1984 | Saegusa et al. | 354/448 |

Primary Examiner—Russell E. Adams
Attorney, Agent, or Firm—Shapiro and Shapiro

[57] ABSTRACT

An exposure control method and apparatus for camera enables to carry out TTL light intensity feedback metering based on the output of light-measurement even when the output has a value not within a predetermined range of arithmetic operation for exposure control. In the method and apparatus, the luminance of an object field formed by the light transmitted through a taking-lens is metered to generate photometric outputs. The photometric outputs are arithmetically processed to generate arithmetic outputs while inhibiting those of the photometric outputs from being arithmetically processed which are outside of a predetermined range of output value, the aperture value is controlled in accordance with the photometric outputs.

23 Claims, 17 Drawing Figures

METHOD AND APPARATUS FOR THE AUTOMATIC CONTROL OF EXPOSURE IN CAMERA

BACKGROUND OF THE INVENTION

1. Field of the Invention

The present invention relates to a method and apparatus for the automatic control of exposure of a film in a camera in which an optimum exposure of the film is determined by metering the luminance of an object field formed by the light transmitted through a taking-lens of the camera and picking up a most suitable one of the outputs derived from the metering.

2. Description of the Prior Art

In taking a picture of an object there is the case where the picture field of the object contains a portion of especially high luminance such as the sun. In such a case, the conventional metering system of camera produces an under-exposed picture. The reason for this is that the high luminance portion, even when it occupies only a small portion of the picture field, has a larger absolute value of luminance than that of the main object. Even if the luminance values are averaged, the mean value of luminance will be still far larger than the luminance value of the main object portion. Therefore it is impossible to obtain a picture of an optimum exposure for the main object.

As another possibility there is such a case where the luminance of a portion of the picture field of the object is under the lower limit of metering while the remaining portion has a sufficiently high luminance for metering. An example of such a case is an object illuminated by a spot-light. The conventional metering system of a camera is almost incompetent for such an object.

In order to overcome the above drawbacks of the conventional systems there has been proposed a system called multi-pattern metering which is disclosed, for example, in the copending application Ser. No. 123,209 filed on Feb. 21, 1980 and abandoned in favor of continuation application Ser. No. 391,864, now U.S. Pat. No. 4,476,383. In this metering system, an arithmetic operation for exposure is carried out using only those photoelectric outputs lying within a predetermined range of output value while cutting out such an output or outputs lying out of the range. Thus, an exposure is determined while excluding the outputs outside of the predetermined range from computation.

However, the multi-pattern metering system has a problem when it is embodied in TTL automatic exposure control apparatus of a camera, in particular, a TTL light intensity feedback metering system. In the TTL light intensity feedback metering system, the exposure is controlled by detecting the opening of the aperture stopped down in accordance with the luminance of the object through the aperture stop. Prior to the exposure, the aperture of the lens is gradually stopped down starting from the maximum aperture value and the light transmitted through the lens is measured while stopping the aperture down. As the control of exposure is carried out in this manner, if the output from the light measuring is partly cut out according to the above multi-pattern metering method, then the exposure control is no longer possible for this type of automatic exposure control camera.

SUMMARY OF THE INVENTION

Accordingly it is an object of the invention to provide an exposure control method and apparatus for a camera which enables TTL light intensity feedback metering based on the output of light-measurement even when the output has a value not within a predetermined range of arithmetic operation for exposure control.

In one aspect of the present invention, the above object is attained by metering the luminance of an object field formed by the light transmitted through a taking-lens to generate photometric outputs; arithmetically processing the photometric outputs to generate arithmetic outputs while inhibiting those of the photometric outputs from being arithmetically processed which are outside of a predetermined range of output value; and controlling the aperture value in accordance with the photometric outputs.

In another aspect of the present invention, the above object is attained by metering the luminance of the object field at a plural number of divided areas of the field to generate photometric outputs corresponding to the individual divisional areas; arithmetically processing the photometric outputs to generate arithmetic outputs while inhibiting those of the photometric outputs from being arithmetically processed which are outside of a predetermined range of output value; and controlling the exposure in accordance with at least one of the photometric outputs.

Other and further objects, features and advantages of the invention will appear more fully from the following description taken in connection with the accompanying drawings.

DESCRIPTION OF THE PREFERRED EMBODIMENTS

Figure 1A:
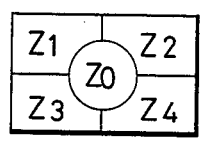
FIGS. 1A and 1B illustrate examples of divided areas to be measured by the multi-pattern metering.
Figure 1B:
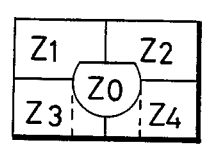

In the multi-pattern metering apparatus according to the invention, the picture area of the object field is divided into a plural number of zones. FIG. 1A shows an example of division of the picture area. In this example, the picture area of object field is divided into five zones, namely, a central zone Z0 and four peripheral zones Z1, Z2, Z3 and Z4 surrounding the central zone Z0. FIG. 1B shows a modification of the example in FIG. 1A. The central zone Z0 in FIG. 1B is different from that in FIG. 1B in shape. In the modification shown in FIG. 1B, the central zone Z0 has a sensitivity area expanded downwardly as compared to the example shown in FIG. 1A. Of course, the manner of division is never limited to the above examples only. Other various dividing methods may be used for the multi-pattern metering. However, it has been acknowledged that the complexity of circuits and the effect of multi-pattern metering, can be well-balanced when the picture area of the object field is divided into five zones in the manner as shown in FIGS. 1A and 1B (cf. U.S. Pat. No. 4,274,721).

Figure 2:
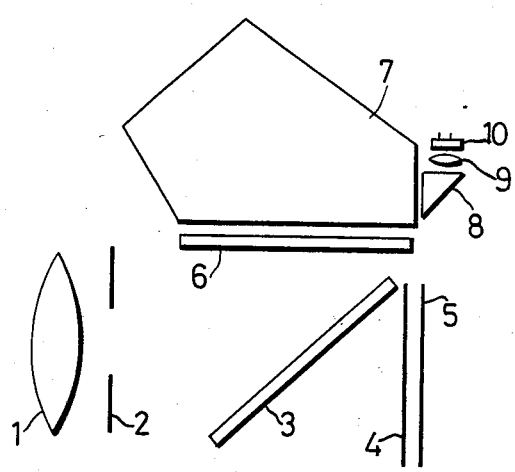
FIG. 2 is a sectional view of a metering optical system.

FIG. 2 shows the arrangement of a metering optical system used in the apparatus.

An object light enters a taking-lens 1 and passes through a diaphragm 2. Then, the light is reflected by a quick-return mirror 3 toward a pentaprism 7 through a finder screen 6. A film plane 5 is disposed behind a shutter 4. Through an eyepiece (not shown), the object light is guided to the eye of the operator from the prism 7 so that the operator can observe the object picture field through the eyepiece. On both sides of the eyepiece (not shown) there are provided a trigonal prism 8, condenser 9 and silicon photo-diode 10 (hereinafter referred to as SPD in brief).

Figure 3:
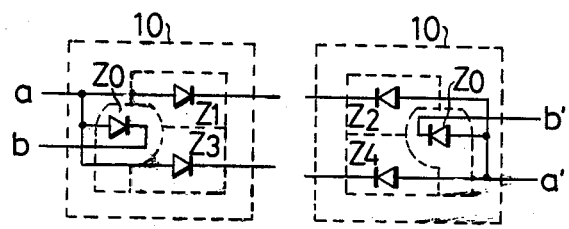
FIG. 3 shows a pattern of SPD for realizing the example of division as shown in FIG. 1B.

FIG. 3 shows the pattern of SPD used to realize the division of the picture area previously shown in FIG. 1B. Z0 to Z4 in FIG. 3 correspond to those in FIG. 1B. For the central zone Z0, the left-hand SPD and the right-hand SPD are parallel-connected to each other with a being connected with a' and b with b'.

Figure 4:
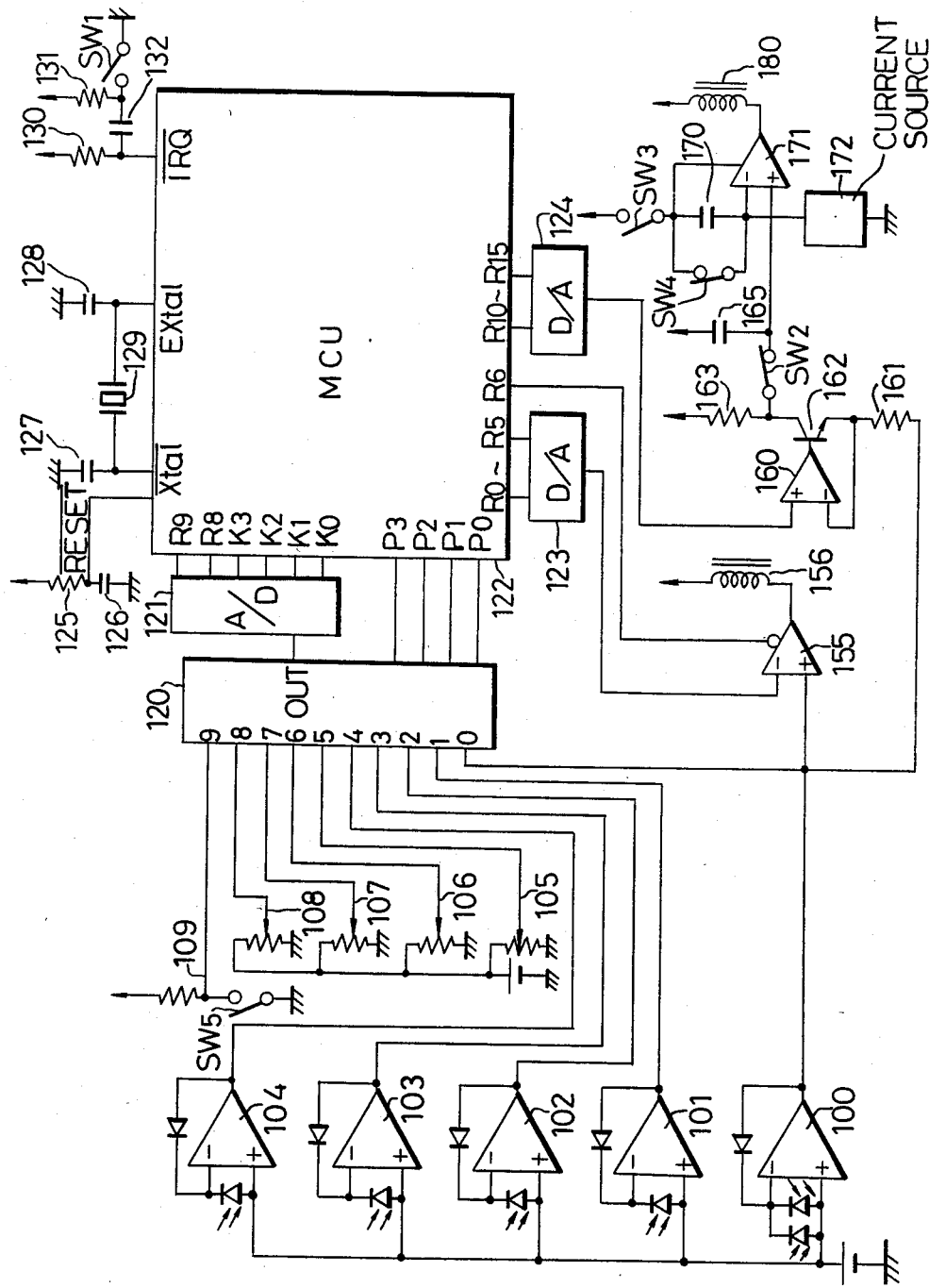
FIG. 4 is a block diagram showing an embodiment of the invention.

FIG. 4 is a detailed block diagram showing an embodiment of the invention.

Metering circuits 100 to 104 are of the known structure composed of SPD, reference voltage source, log diode and operational amplifier. The five zones Z0 to Z4 as shown in FIGS. 1A and 1B are measured in luminance by the five metering circuits 100 to 104 respectively to produce outputs of measurement at maximum aperture (photometric outputs) PV0 to PV4. As seen from the SPD pattern shown in FIG. 3, the metering circuit 100 includes the right-hand SPD and the left-hand SPD connected parallel to each other at the area corresponding to the central zone Z0. Thereby, the precision of measurement of the metering circuit 100 is increased so that the output of the metering circuit 100 can be used also as a monitoring photometric output for controlling the aperture or shutter according to the TTL light intensity feedback metering system. After releasing the shutter, the photometric output thereof changes depending on aperture value AV and becomes BVo−AV wherein BVo is the luminance value of the central zone to be monitored. Potentiometers 105 to 108 are provided to set the value of shutter time TV, the value of maximum aperture AVo, the value of set step of aperture stop $AV_M - AVo$ (wherein $AV_M$ is the aperture value manually set) and the value of film sensitivity SV respectively. The potentiometers generate signals in analog quantity corresponding to the set values. When aperture value priority mode (hereinafter referred to as A-mode briefly) is selected, a mode switch Sw5 is opened and a mode setting device 109 produces a high level output. When shutter time priority mode (S-mode) is selected, the mode switch Sw5 is closed and the mode setting device 109 produces a low level output. Hereinafter, the state of low level output will be referred to also briefly as "L" and that of high level output as "H". In an analog switch circuit 120 the analog quantity on one of input terminals 9-0 is selected in accordance with the value 9, 8, ... 1, 0 set by the output from terminals P3 - P0 of a microcomputer unit 122 (referred to as MCU 122), and the selected analog quantity is transmitted to an output terminal OUT. The selected analog quantity from the analog switch circuit 120 is converted into a digital value by a 6-bit A/D converter 121. The significant two bits of the digital value are transmitted to terminals R9 and R8 of the MCU and the less significant four bits are transmitted to terminals K3, K2, K1 and K0 respectively.

6-bit D/A converters 123 and 124 receive outputs from terminals R5–R0 and R15–R10 of the MCU and then generate analog quantities determined by the outputs. Data introduced into the D/A converter 123 is the reference for aperture control, $\$18 + TV_M - SV(*)$ (herein the symbol $ means hexadecimal) and data introduced into the D/A converter 124 is the set value of film sensitivity for shutter control, ($\$33 - SV(*)$). $18 and $33 are reference values of input data to the D/A converters 123 and 124. $SV(*)$ is the value of film sensitivity after correction by multi-pattern metering. A further description of the value $SV(*)$ will be made later. Herein, hexadecimal digit to decimal 0-15 is expressed in 0, 1, -9, A, B, -F.

A diaphragm control device 155 is brought into operation when the output from terminal R5 of MCU 122 is rendered to "L" after releasing the shutter. Applied to the non-inversion input terminal of the diaphragm control device is the photometric output of the metering circuit 100 in the course of aperture stop-down, that is, $PVo' = BVo - Av$. Applied to the inversion input terminal is the reference output of the D/A converter 123, that is, $\$18 + TV_M - SV(*)$.

When $$BVo - AV \leq \$18 + TV_M - SV(*) \tag{1}$$

a magnet 156 is energized to stop the stopping-down of aperture. Let the aperture value at the moment be Avs. Then, $$BVo - AVs = \$18 + TV_M - SV(*) \tag{2}$$

As previously mentioned, $SV(*)$ is the value of film sensitivity after correction by multi-pattern metering and is given by the following relation formula:

$$SV(*) = (BVans - BVo) + SV \tag{3}$$

wherein, BVans is the luminance value computed from photometric outputs PV0 to PV4 by the multi-pattern metering and BVo is the luminance value of the central zone.

As will be understood from the above, the value SV(*) is a value as given by adding a correction value (BVans−BVo) to the set value of film sensitivity SV. From the above equations (2) and (3), $$BVo - AVs = \$18 + TV_M - (BVans - BVo) - SV \quad (4)$$

$$BVans + SV = \$18 + TV_M + AVs \quad (4)'$$

It will be seen from the equation (4)' that the aperture value AVs is controlled to the luminance value BVans which is optimum for the set film sensitivity SV and the set shutter time $TV_M$. Herein, the value of $TV_M$ is the preset shutter time for S-mode. When A-mode is selected, it is the shutter time computed by MCU 122 taking into account the preset aperture value.

The analog quantity ($33−SV(*)) set at the D/A converter 124 is applied to the non-inversion input terminal of an operational amplifier 160. The inversion input terminal of the amplifier 160 is connected to one terminal of a resistor 161 to which is connected also the emitter of a transistor 162. Therefore, the potential on the one terminal of the resistor 161 is equal to ($33−SV(*)). Applied to the other terminal of the resistor 161 is the photometric output of the central zone generated from the metering circuit 100 when the aperture value becomes $AV_M$ or AVs after releasing the shutter, that is, the output ($BVo−AV_M$) or (BVo−AVs) wherein $AV_M$ is the set aperture value. Consequently, the potential difference between the two terminals of the resistor 161 in A-mode is ($33−SV(*))−(BVo−$AV_M$). Using the above equation (3) gives:

$$\begin{aligned} \$33 - (BVans - BVo) - SV - (BVo - AV_M) \\ = \$33 - (BVans + SV - AV_M) \\ = \$33 - TVs. \end{aligned} \quad (5)$$

For S-mode, $AV_M$ is replaced by $AV_S$.

TVs in formula (5) is a value of shutter time which gives an optimum exposure (BVans+SV) for the aperture value $AV_M$ stopped down before mirror-up and therefore satisfies the following relation:

$$BVans + SV = AV_M + TV_S \quad (6)$$

For S-mode, $AV_M$ in the formula (6) is replaced by $AV_S$.

Providing that the transistor 162 has a sufficiently high hFE, substantially the same amount of current flows through resistors 161 and 163. Therefore, when the two resistors have the same resistance value, the potential difference between two terminals of the resistor 163 will correspond to $33−TVs. The circuit 160−163 serves as a shutter time computing circuit.

A mirror switch Sw2 is opened at the time of mirror-up and is closed after mirror-down. When the mirror switch Sw2 is opened after a determined time of releasing operation, the shutter time arithmetic output ($33−TVs) immediately before the mirror-up is stored in a memory condenser 165.

At the mirror-up, a switch Sw3 is closed to bring a comparator 171 into operation. Since a trigger switch Sw4 (which is opened in link with the running of the leading shutter member) is still in its closed position at that time, the output of the comparator 171 becomes "L". A shutter magnet 180 is energized and the trailing shutter member is held in its starting position by a mechanical member until the trigger switch Sw4 is opened. With the running of the leading shutter member the trigger switch Sw4 is opened and a timer condenser 170 is charged by a current source 172. Thus, at both terminals of the condenser 170 there is produced a voltage corresponding to the exposure time. In accordance with the potential of $33−$TV_S$ previously stored in the memory condenser 165 and, when the shutter time is high speed (when TVs is large), at the time point at which charge has been stored on the condenser 170 in a short time, the output of the comparator 171 is inverted and the shutter magnet 180 is deenergized. Thus, the trailing shutter member is released from locking and allowed to start running. In this manner, the shutter time is controlled to a determined value. When TVs is small, it takes a longer time to charge the timer condenser 170 and therefore the shutter time is controlled to a lower shutter speed.

A resistor 125 and a condenser 126 are connected in series to each other. A reset terminal $\overline{RESET}$ of MCU 122 is connected to the junction of 125 and 126 so as to reset the MCU in response to the throw-in of the power source. Condensers 127, 128 and an oscillator 129 are connected to terminals Xtal and EXtal of the MCU 122 to generate referential oscillation by an internal oscillation circuit. Resistors 130, 131 and condenser 132 constitute together a differentiation circuit for the release switch Sw1. The circuit is connected to a terminal $\overline{IRQ}$ of the MCU 122 to allow interruption when releasing is done.

Figure 5:
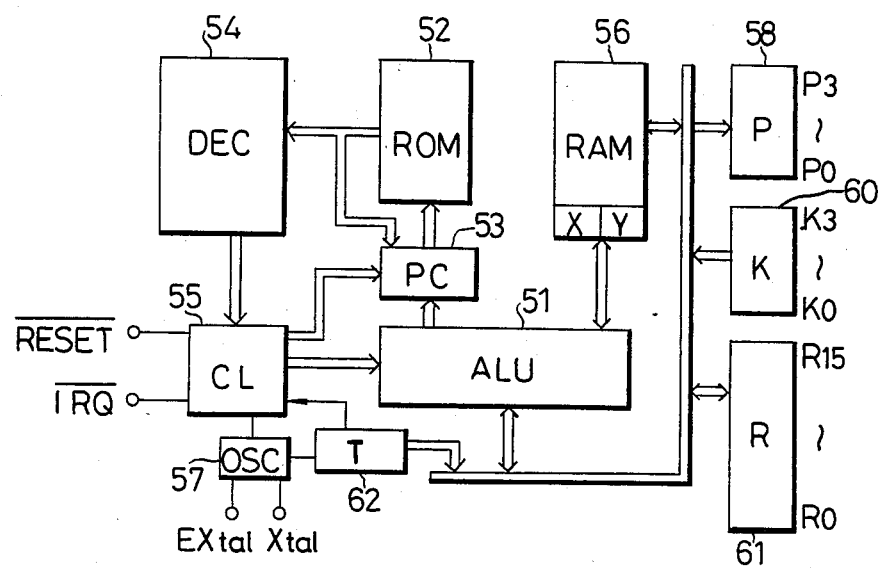
FIG. 5 shows the arrangement of elements in MCU used in FIG. 4 embodiment.

The MCU122 is a 4-bit micro-computer whose internal structure is shown in FIG. 5.

Referring to FIG. 5, the micro-computer comprises: arithmetic logic unit ALU 51, a ROM 52 in which instructions to MCU have been written, a program counter PC53 for assigning addresses of ROM, an instruction decoder DEC 54 for decoding the instruction from ROM, a control logic unit CL 55 for executing the decoded instruction, a RAM 56 functioning as a register assigned by X, Y, an oscillation circuit OSC 57, an output-only port P 58 for terminals P0 to P3, an input-only port K 60 for terminals K0 to K3, an input / output port R 61 for terminals R0 to R15 and a timer T 62. A part of the RAM contains information to be used in the manner shown in the following table, Table 1. Since, as previously noted, the micro-computer is a 4-bit micro-computer, the RAM includes also a part in which 2-word 8-bit data memory is used as a register. The part is indicated by the character affixed to Z in the table. In the following description, M[a, b] stands for 4-bit data memory of RAM assigned when X register is a and Y register is b.

TABLE 1

| Y | \multicolumn{6}{c}{X} |
| | 7 | 6 | 5 | 4 | 3 | 2 | 1 | 0 |
|---|---|---|---|---|---|---|---|---|
| 0 | | | | | $Z_{10}$ [$BV_0$] | | $Z_{00}$ [$PV_0$] | |
| 1 | | | | | $Z_{11}$ [$BV_1$] | | $Z_{01}$ [$PV_1$] | |
| 2 | | | | | $Z_{12}$ [$BV_2$] | | $Z_{02}$ [$PV_2$] | |

TABLE 1-continued

| Y | 7 | 6 | 5 | 4 | 3 | 2 | 1 | 0 |
|---|---|---|---|---|---|---|---|---|
| 3 | | | | | $Z_{13}$ | $[BV_3]$ | $Z_{03}$ | $[PV_3]$ |
| 4 | [C] | | | | $Z_{14}$ | $[BV_4]$ | $Z_{04}$ | $[PV_4]$ |
| 5 | [L] | | | | $Z_{15}$ | $[BV_0(*)]$ | $Z_{05}$ | $[TV_M]$ |
| 6 | [CL] | | | | | | $Z_{06}$ | $[AV_0]$ |
| 7 | | | | [SUM] | $Z_{17}$ | [SUM] | $Z_{07}$ | $[AV_M - AV_0]$ $\downarrow$ $[AV_M]$ |
| 8 | [N] | | | | $Z_{18}$ | $[BV_M]$ $\downarrow$ $[SV(*)]$ | $Z_{08}$ | [SV] |
| 9 | | | | | | | $Z_{09}$ | [mode] |
| A | | | | | | | | |
| B | | | | | | | | |
| C | | | | | | | | |
| D | | | | | | | | |
| E | | | | | $Z_{1E}$ | $[\$18 + TV_M - SV(*)]$ | | |
| F | | | | | $Z_{1F}$ | $[\$33 - SV(*)]$ | | |

Figure 6:
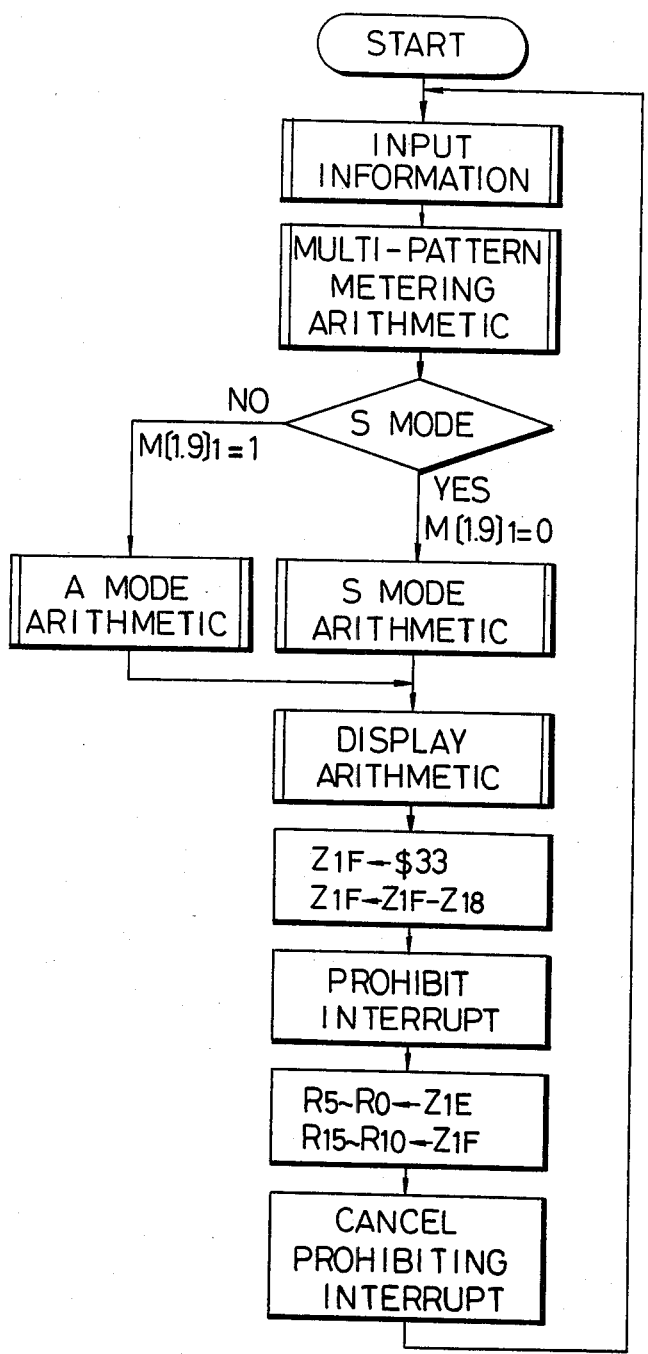
FIG. 6 is a flow chart of the MCU 122.

FIG. 6 is a flow chart of MCU 122 showing the manner of operation thereof.

First, according to a sub-routine for the input of information, the maximum aperture photometric outputs PV0 to PV4 of the metering circuits 100 to 104 and various data preset by the above-described setting devices are introduced. Following the input of information, an optimum luminance value BVans is computed and a corrected film sensitivity value SV(*) is computed according to a multi-pattern metering arithmetic sub-routine. Thereafter, the mode is discriminated between A-mode and B-mode and then A-mode arithmetic operation or B-mode arithmetic operation is carried out. The result from the arithmetic operation is stored in a register in the following manner:

When the mode is S-mode, the mode switch Sw5 is closed and the output of the setting device 109 is "L". Accordingly, "$ 00" is stored in the register $Z_{09}$ of RAM indicated by M[0, 9] and M[1, 9]. When the mode is A-mode, the mode switch Sw5 is opened and the output of the setting device 109 is "H". Accordingly, "$ 3F" is stored in the register $Z_{09}$. Although $Z_{00}$ to $Z_{09}$ are 8-bit registers, X registers on the side of 0 correspond to less significant four bits $2^0$ to $2^3$ and X registers on the side of 1 correspond to significant four bits $2^4$ to $2^7$. Affix "Y" in $Z_{0Y}$ means Y register. Therefore, A-mode or B-mode can be verified by checking the digit in the $2^1$ position of M[1, 9] of $2^5$ figures in $Z_{09}$. Thus, when $$M[1, 9]_1 = 0 \tag{7}$$

the mode is S-mode. Similarly, when $$M[1, 9]_1 = 1 \tag{8}$$

the mode is A-mode. Herein the affix n in $M[a, b]_n$ means that it is the memory in the $2^n$ position of figures of the data memory.

After completing the A-mode or B-mode arithmetic operation by $M[1, 9]_1$, a display arithmetic operation is carried out.

Then, after setting of $$Z_{1F} \leftarrow \$33 \tag{9}$$

an arithmetic operation of $$Z_{1F} \leftarrow Z_{1F} - Z_{18} \tag{10}$$

is carried out.

Herein, $Z_{18}$ corresponds to M[2, 8] and M[3, 8], and $Z_{1F}$ corresponds to M[2, F] and M[3, F]. As shown in Table 1, $Z_{10}$ to $Z_{1F}$ are 8-bit registers and, therefore, X registers on the side of 2 correspond to less significant four bits $2^0$ to $2^3$ X registers on the side of 3 correspond to significant four bits $2^4$ to $2^7$. As will be described later, there has been stored in $Z_{18}$ a value of SV(*) previously obtained by the previous steps of multi-pattern metering and A- and B-mode arithmetic operations. Consequently, $33 − SV(*) is now registered in the register $Z_{1F}$.

After provisionally prohibiting interruption, the stored $2^5$ to $2^0$ figure information, $18 + TV$_{M-SV(*)}$ and $33 − SV(*) are transmitted to terminals R5 to R0 and R15 to R10 of MCU 122 from the registers $Z_{1E}$ and $Z_{1F}$. The information $18 + TV_M − SV(*) and $33 − SV(*) are set in D/A converters 123 and 124.

Subsequently, the prohibiting of interruption is cancelled and the above operation is repeated from the start address. The reason why interruption is prohibited during the output of information from the registers $Z_{1E}$ and $Z_{1F}$ is that it is necessary to prevent interruption by releasing in the course of renewal of D/A converters 123 and 124.

Figure 7:
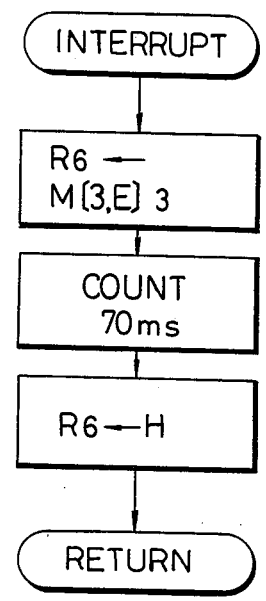
FIG. 7 is a flow chart of the interrupt processing routine of the MCU 122.

FIG. 7 shows a sub-routine for processing interruption as made when the release switch Sw1 is closed by the operator's depression of the shutter button and the output level of IRQ terminal of MCU 122 is rendered "L".

At first, the bit of $M[3, E]_3$ of $2^7$ figures of the register $Z_{1E}$ is set at R6 terminal. After the lapse of a time determined by an internal timer, the output of the terminal R6 is turned to "H". The timer time is the maximum time required to stop down the aperture plus some allowance time. For example, the output of the terminal R6 is turned to "H" after the lapse of 70 ms. $M[3, E]_3$ serves as a flag of whether the aperture control should be executed or not. For A-mode, because of 1 being set, "H" level output appears at the terminal R6 and, therefore, the aperture control means 155 remains inactive. The aperture is stopped down to the set value $AV_M$. For S-mode in which 0 is set, an aperture control is executed after releasing the shutter. Therefore, the magnet 156 is never energized before the releasing.

Figure 8:
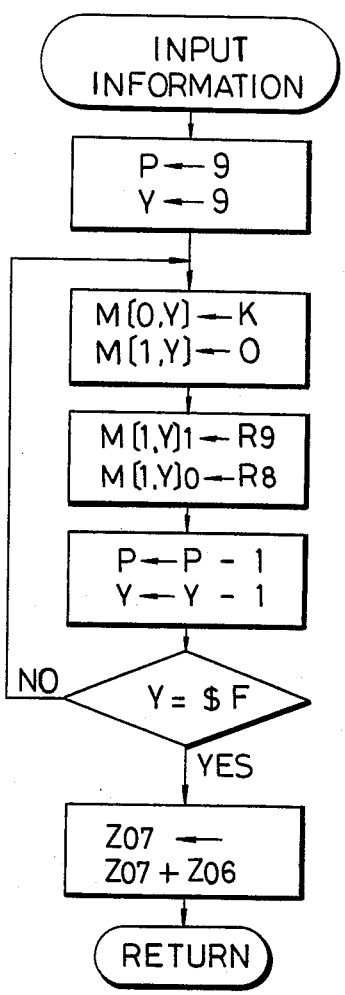
FIG. 8 is a flow chart of the sub-routine for the input of information in FIG. 6.

FIG. 8 is a flow chart of the sub-routine for the input of information.

P port is set to 9 whereby Y register in Table 1 is set to 9. Four bits of K port are stored in M[0, 9] and M[1, 9] is cleared. $M[1, 9]_1$ and $M[1, 9]_0$ which are $2^1$ and $2^0$ of $M[1, 9]$ are set as the inputs to terminals $R_9$ and $R_8$. The above operation is repeated for $M[1, Y]$ and $M[0, Y]$ while decreasing the values of P and Y by 1 every time. When Y becomes negative and $F, the storing of information in all of $Z_{09}$ to $Z_{00}$ in Table 1 to completed. In $Z_{09}$ the information of mode is stored, in $Z_{08}$ the information of film sensitivity [SV], in $Z_{07}$ the information of the set step of aperture stop $[AV_M - AVo]$, in $Z_{06}$ the information of the maximum aperture value $[AVo]$, in $Z_{05}$ the information of the set shutter time $[TV_M]$ and in $Z_{04}$ to $Z_{00}$ there are stored the outputs of the five metering circuits [PV4] to [PVo]. Lastly, by $$Z_{07} \leftarrow Z_{07} + Z_{06} \tag{11}$$

there are stored in the register $Z_{07}$;

$$[AV_M] \leftarrow [AV_M - AVo] + [AVo] \tag{11'}$$

and the information of the set aperture value $[AV_M]$.

Figure 9:
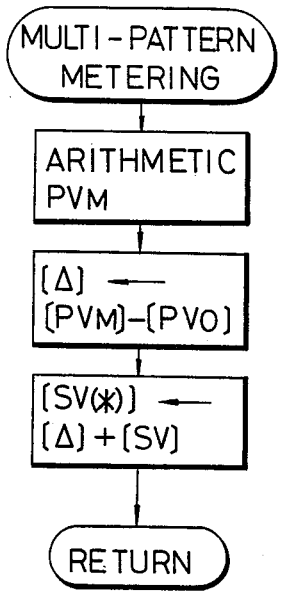
FIG. 9 is a flow chart of the sub-routine for the multi-pattern metering arithmetic in FIG. 6.

FIG. 9 is a flow chart of a basic multi-pattern metering arithmetic sub-routine. As previously described, an optimum luminance value BVans is obtained by a computation using the five photometric outputs PV4 to PV0. As the simplest method of obtaining the optimum luminance value, the flow chart shows a method of obtaining a mean arithmetic output $PV_M$ as an example.

A correction value $\Delta$ is obtained by $$\Delta = PV_M - PVo \tag{12}$$

and then a corrected film sensitivity value SV(*) is obtained by $$SV(*) = \Delta + SV \tag{13}$$

Figure 10:
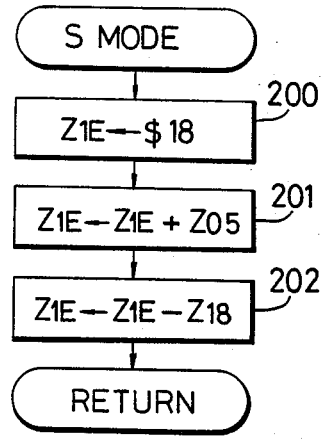
FIG. 10 is a flow chart of the sub-routine for the S-mode arithmetic.

FIG. 10 is a flow chart of S-mode arithmetic sub-routine. At the first step, Step 200 the setting of $$Z_{1E} \leftarrow \$18 \tag{14}$$

is carried out to set 0 in $M[3, E]_3$ as information of S-mode in which the aperture i.s to be controlled. Also, information of shift is set thereby.

At the next step, Step 201 the content of the register Z is added in, which the set shutter time $TV_M$ has been stored.

At Step 202, the subtraction of the corrected film sensitivity value SV(*) is carried out. The result is:

$$Z_{1E} \leftarrow \$18 + TV_M - SV(*) \tag{15}$$

Figure 11:
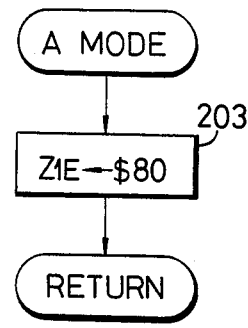
FIG. 11 is a flow chart of the sub-routine for the A-mode arithmetic.

FIG. 11 is a flow chart of A-mode arithmetic sub-routine.

At Step 203 there is carried out the setting of $$Z_{1E} \leftarrow \$80 \tag{16}$$

As a result of it, $M[3, E]_3 = 1$. Therefore, after releasing the shutter, the output of the terminal R6 continues to be "H" to keep the aperture control circuit inactive. Consequently the aperture is stopped down to the preset value.

Figure 12:
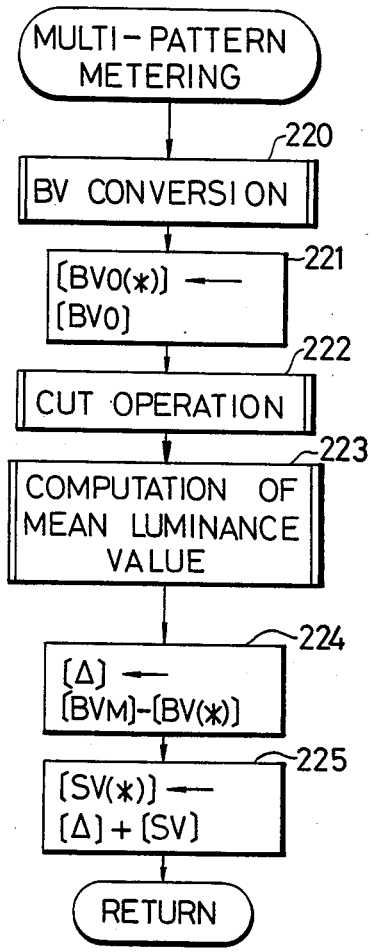
FIG. 12 is a flow chart of the sub-routine for the multi-pattern metering arithmetic in FIG. 6 according to the first embodiment of the invention.

FIG. 12 is a flow chart of multi-pattern metering showing an embodiment of the invention.

At Step 220 of BV conversion, the outputs PV4 to PV0 stored in $Z_{04}$ to $Z_{00}$ are converted into the corresponding luminance values BV4 to BV0 which are then stored in $Z_{14}$ to $Z_{10}$. $Z_{04}$ to $Z_{00}$ correspond to $M[0, 4]$, $M[1, 4], \ldots, M[0, 1]$ and $M[1, 1]$ shown in Table 1, and $Z_{14}$ to $Z_{10}$ correspond to $M[2, 4], M[3, 4], \ldots, M[2, 1]$ and $M[2, 0]$.

At step 221, the luminance value BVo of the central zone is stored in the holding register $Z_{15}$ for shelter (corresponding to $M[2, 5]$ and $M[3, 5]$). The sheltered BVo is referred to as BVo(*). As previously noted, the central zone luminance value BVo is useful as a monitor for aperture control and shutter control. The value BVo is needed to control the aperture according to the principle of TTL light intensity feedback metering system. In the multi-pattern metering arithmetic operation, however, the luminance value BVo is cut out to exclude it from computation if the value BVo exceeds a predetermined level (for example, a level corresponding to EV 16 at BV 11 and ISO 100) or becomes lower than the lower limit for measurement. Even if it is over the upper limit or under the lower limit, the value BVo is necessary for the TTL light intensity feedback metering. For this reason, the central zone luminance value BVo is held in the sheltering register as BVo(*) at this step.

At Step 222, the cut operation mentioned above is carried out. Data of such a zone or zones in which the luminance value is over the determined level or under the measurable lower limit are all cut out.

At Step 223 a computation for obtaining an optimum luminance value BVans is carried out. In this embodiment, as the simplest method, a computation of mean luminance value $BV_M$ is carried out which is used as the optimum luminance value BVans. Consequently, the value $BV_M$ is stored in the register $Z_{18}$ corresponding to $M[2, 8]$ and $M[3, 8]$.

At Step 224, the value BVo(*) in the register $Z_{15}$ is subtracted from the content of the register $Z_{18}$. As a result, in the register $Z_{18}$ there is now stored a correction value of $$\Delta = BV_M - BVo(*) \tag{17}$$

This equation (17) corresponds to the above equation (12). As the correction value obtained by the multi-pattern metering arithmetic operation, the value given by (12) and that by (17) have the same function.

At Step 225, the film sensitivity value SV stored in the register $Z_{08}$ is added to the content of the register $Z_{18}$. Thereby the register $Z_{18}$ has a value of film sensitivity SV(*) stored therein which is the value corrected according to the above formula (13).

Figure 13:
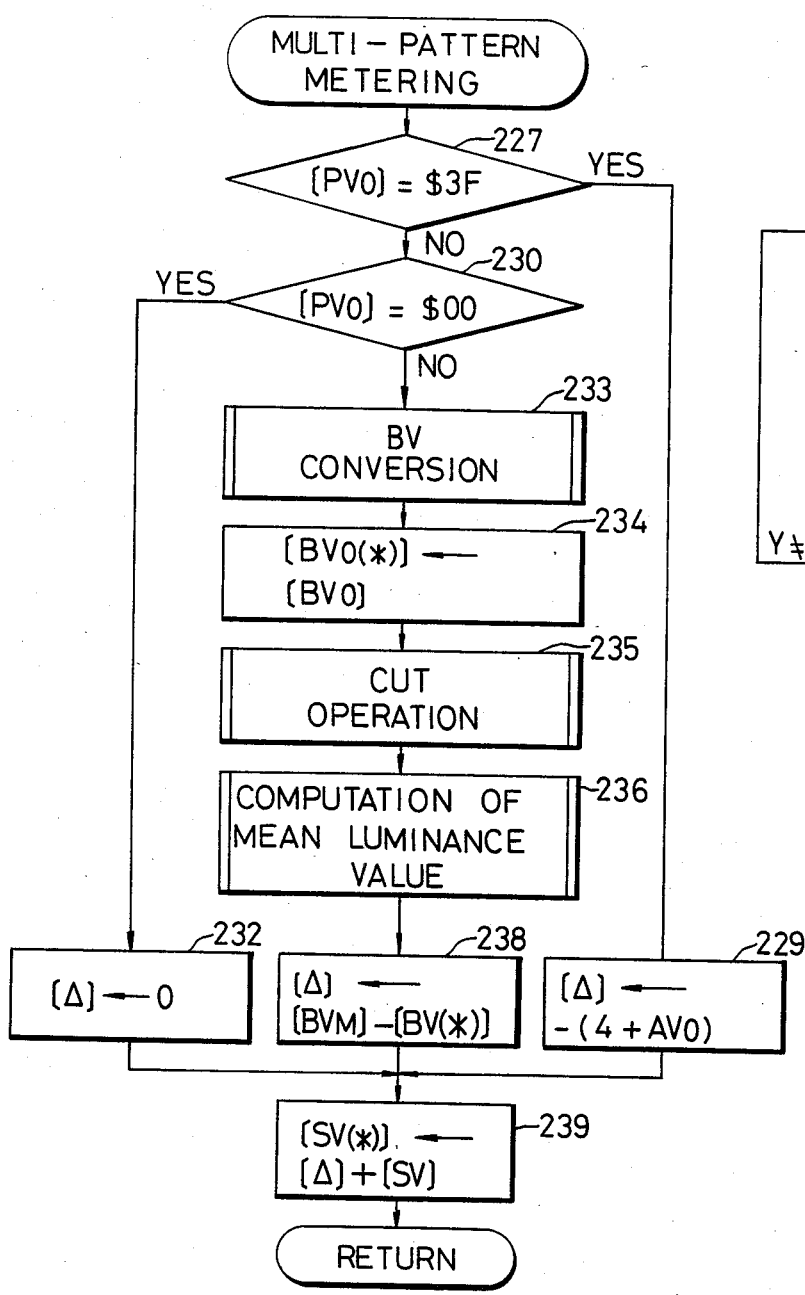
FIG. 13 is a flow chart of the sub-routine for the multi-pattern metering arithmetic according to the second embodiment of the invention.

FIG. 13 is a flow chart showing a second embodiment of the invention. The following table, Table 2 shows EV values of BV − AVo and EV values of BV after the conversion into hexadecimal values. 1[EV] corresponds to $3. The data in Table 2 are of 50 mm, F1.4 lens.

TABLE 2

| BV - AVo | | BV | |
|---|---|---|---|
| A/D converted value | EV value (50 mm/F1.4) | A/D converted value | EV value |
| $ 0 | 0 | $ 0 | −6 |
| $ 3 | 1 | $ 3 | −5 |
| $ 6 | 2 | $ 6 | −4 |
| $ 9 | 3 | $ 9 | −3 |
| $ C | 4 | $ C | −2 |
| $ F | 5 | $ F | −1 |
| $ 12 | 6 | $ 12 | 0 |
| $ 15 | 7 | $ 15 | 1 |
| $ 18 | 8 | $ 18 | 2 |

TABLE 2-continued

| BV - AVo | | BV | |
|---|---|---|---|
| A/D converted value | EV value (50 mm/F1.4) | A/D converted value | EV value |
| $ 1B | 9 | $ 1B | 3 |
| $ 1E | 10 | $ 1E | 4 |
| $ 21 | 11 | $ 21 | 5 |
| $ 24 | 12 | $ 24 | 6 |
| $ 27 | 13 | $ 27 | 7 |
| $ 2A | 14 | $ 2A | 8 |
| $ 2D | 15 | $ 2D | 9 |
| $ 30 | 16 | $ 30 | 10 |
| $ 33 | 17 | $ 33 | 11 |
| $ 36 | 18 | | |
| $ 39 | 19 | | |
| $ 3C | 20 | | |
| $ 3F | 21 | | |

Referring to the flow chart in FIG. 13, the operation is started from Step 227. The Step 227 is a step for checking the level of the central zone photometric output PVo as to whether it reaches the upper limit of A/D conversion. Since the A/D converter 121 shown in FIG. 4 is a 6-bit converter, the upper limit is $3F. If PVo is over the upper limit, the output of A/D converter 121 remains at $3F. Therefore, at the Step 227, it is checked if the following relation is held:

$$[PVo]=\$3F \tag{18}$$

When the relation (18) is held, $F4 corresponding to $-4[EV]$ is registered in the register $Z_{18}$ and then AVo in the register $Z_{06}$ is subtracted from the content of the register $Z_{18}$. Thus, $$Z_{18} \leftarrow \$F4 - Z_{06} \tag{19}$$

At Step 229, a correction value $\Delta$ is stored in the register $Z_{18}$ by setting a value corresponding to $-(4+AVo)[EV]$. After that, the operation is jumped to Step 239 at which a value of SV(*) is obtained. The meaning of the operation represented by the formula (19) will be described later. $-4[EV]$ mentioned above corresponds to $C that is the difference between the metering upper limit $3F and the threshold $33 for cut operation in FIG. 15.

Step 230 is a step for checking the output PVo as to whether it is at the lower limit value of A/D conversion and therefore at the measurable lowest value. When there is held the relation, $$[PVo]=\$00 \tag{20}$$

a value corresponding to O[EV] is set at the register $Z_{18}$ by $$Z_{18} \leftarrow \$00 \tag{21}$$

In the register $Z_{18}$ a correction value $\Delta$ is stored at Step 232. After that, the operation is jumped to Step 239 at which a value of SV(*) is obtained. The meaning of the operation represented by the formula (21) will further be described later. Steps 233 to 238 in FIG. 13 correspond to Steps 220 to 225 in FIG. 12 and need not be further described.

Figure 14:
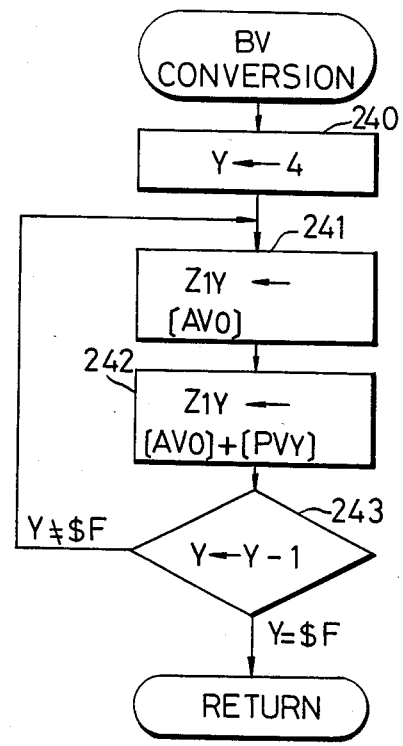
FIG. 14 is a flow chart of the sub-routine for the B-V conversion in FIGS. 12 and 13.

FIG. 14 is a flow chart of BV conversion sub-routine in the embodiments shown in FIGS. 12 and 13.

The outputs PV4 to PVo from the metering circuits are lower than the existing luminance values BV4 to BVo in the object field because the quantity of light is decreased by the maximum aperture value AVo. In order to correct the reduced value the photometric outputs are converted into the corresponding absolute luminance values by BV conversion.

At Step 240, 4 is set at Y register. At Step 241, the content of the register $Z_{06}$ containing the maximum aperture value AVo is transferred to the register $Z_{14}$. At Step 242 the photometric output PV4 stored in the register $Z_{04}$ is added to the content of the register $Z_{14}$. Thus, $$Z_{14} \leftarrow [BV4] = [AVo] + [PV4] \tag{22}$$

Thereafter the operation of $$Z_{1Y} \leftarrow [BVy] = [AVo] + [PVy] (Y=0, 1, \ldots, 3) \tag{23}$$

is repeated while reducing Y register by 1 every time until Y becomes minus. Affix Y in $Z_{1Y}$ means Y register.

By this repeating operation, the five luminance values BV4 to BVo are stored in registers $Z_{14}$ to $Z_{10}$.

Figure 15:
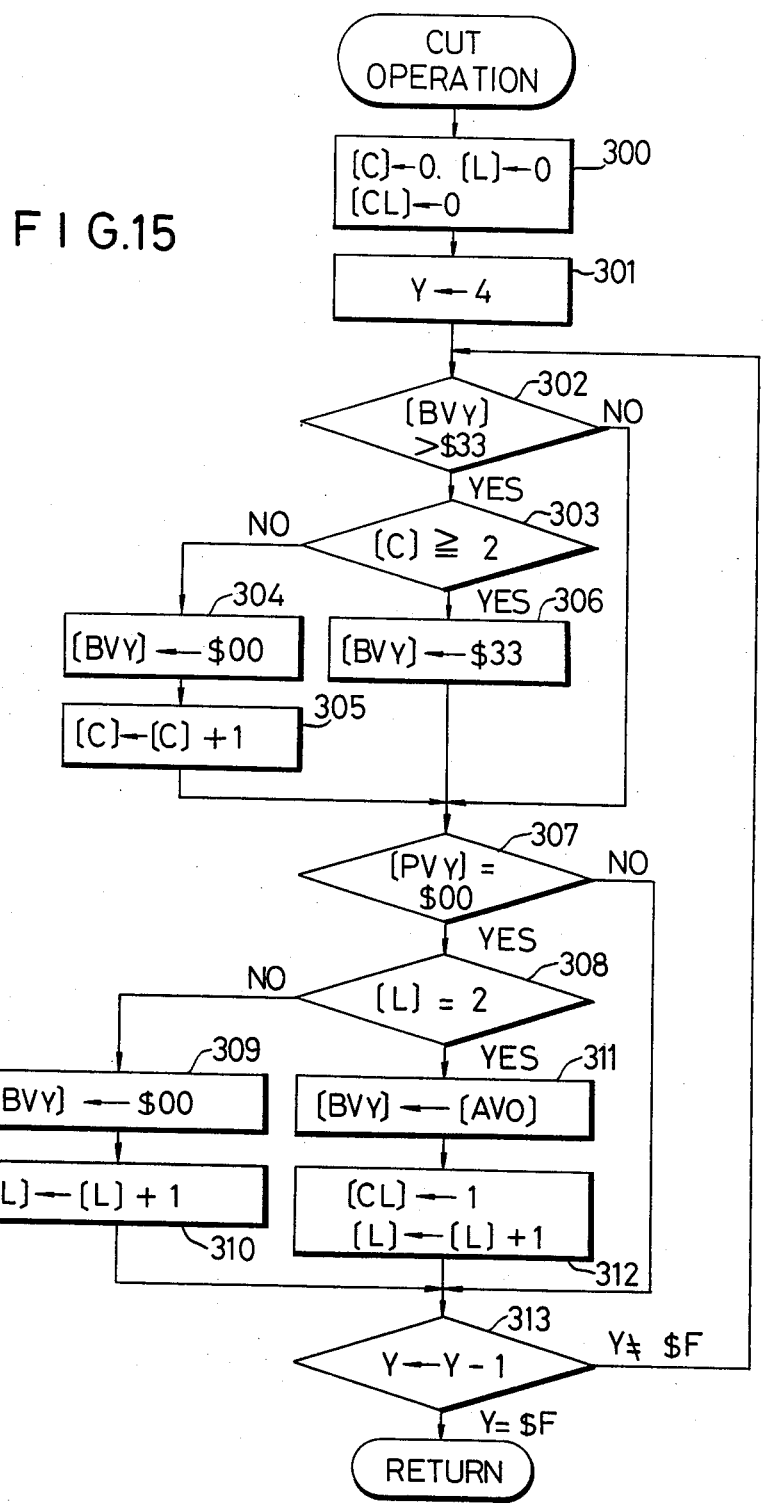
FIG. 15 is a flow chart of the sub-routine for the cut operation in FIGS. 12 and 13.

FIG. 15 is a flow chart of the sub-routine for cut operation shown in FIGS. 12 and 13. At Step 300, data memories [C]=M[7, 4], [L]=M[7, 5] and [CL]=M[7,6] are cleared to use them later for arithmetic operation.

At Step 301, 4 is set at Y register.

At Step 302, a comparison is carried out to verify $$BV_Y > \$33 \ (Y=0, 1, 2, \ldots, 4) \tag{24}$$

($33 corresponds to that BV is 11(EV) as shown in Table 2).

When the relation (26) is held, the operation is advanced to Step 303. If not, then the operation is jumped to Step 307.

At Step 303, when there is held the relation of $$[C] \geq 2 \tag{25}$$

the operation is advanced to Step 306. If not, then it is advanced to Step 304. Since initially [C]=0, the operation is advanced to Step 304 where the following operation is carried out:

$$BV_Y = 0 \ (Y=0, 1, \ldots, 4) \tag{26}$$

At the next step, Step 305, the cut number [C] is increased by an increment of 1. The cut number is the number of the zones not used for multi-pattern metering arithmetic operation of zones Zo to Z4. If the previous cut number was 0, the number is increased to 1 at this step. If it was 1, the cut number is increased to 2.

At Step 306 the setting of $$BV_Y = \$33 \tag{27}$$

is carried out.

The scene for which the relation (25) is held is such a scene which contains the sun. At the above Step 304 such very high luminance zone or zones are cut out to exclude the photometric outputs thereof from the computation for an optimum luminance value. However, if the number of such cut zones [C] is large, the outputs of such zones are no longer negligible. To deal with such a circumstance, a limitation as given by the formula (27) is imposed at Step 306 so that the computation can be carried out taking into account also the outputs of such zones.

On the contrary, when the luminance of the object is low, a comparison is carried out at Step between the photometric output and $00 as the lower threshold PVth.

When there is held the relation of $$PV_Y = \$00 \ (Y = 0, 1, \ldots, 4) \quad (28),$$

the operation is advanced to Step 308. If not held, the step is jumped to Step 313.

At Step 308, the number [L] of zones cut off by the lower threshold is checked as to whether or not $$[L] = 2 \quad (29).$$

When the relation is held, the operation is to Step 311. If not held, the operation is advanced to Step 309. The number initially set is 0.

At Step 309, the operation for cutting out the unacceptable zone or zones is carried out in the same manner as in the case of the above formula (24). At Step 310, the cut number [L] is increased by an increment of 1.

On the other hand, at Step 311, the following operation is carried out:

$$[BV_Y] = [PVth] + [AVo] \quad (30)$$

At the next step, Step 312, 1 is set at the memory [CL] to indicate that the operation of the formula (30) has been carried out. At the same time, the cut number [L] is increased by an increment of 1. When the cut number becomes 3, that is, [L]=3, this operation is stopped.

As will be understood from the above, the zones having such luminance lower than the lower threshold value PVth are neglected at Step 309. However, when the number of such low luminance zones is more than a determined number, they are no longer negligible. In this case, such zones are further processed at Step 310 while regarding the zones as those which have the same values as the lower threshold value PVth.

At the last step, Step 313, Y register is decremented by 1 and the above cut operation is repeated until the register Y becomes minus. Thus, the cut operations for all of BV4 to BV0 are completed.

Though the sub-routine for the computation of mean luminance value in FIGS. 12 and 13 has not been particularly shown and described, briefly speaking the computation is carried out in the following manner:

From [C], [L] and [CL] obtained according to the above cut operation sub-routine shown in FIG. 15, the number of effective zones, N is computed at first as follows:

$$N \leftarrow 5 - C - L + CL$$

Then, the sum of five luminance values is divided by the number of effective zones, N (As [SUM] there are used M[4, 7], M[3, 7] and M[2,7]). The mean luminance value $BV_M$ thus obtained is stored in the register $Z_{18}$.

Figure 16:
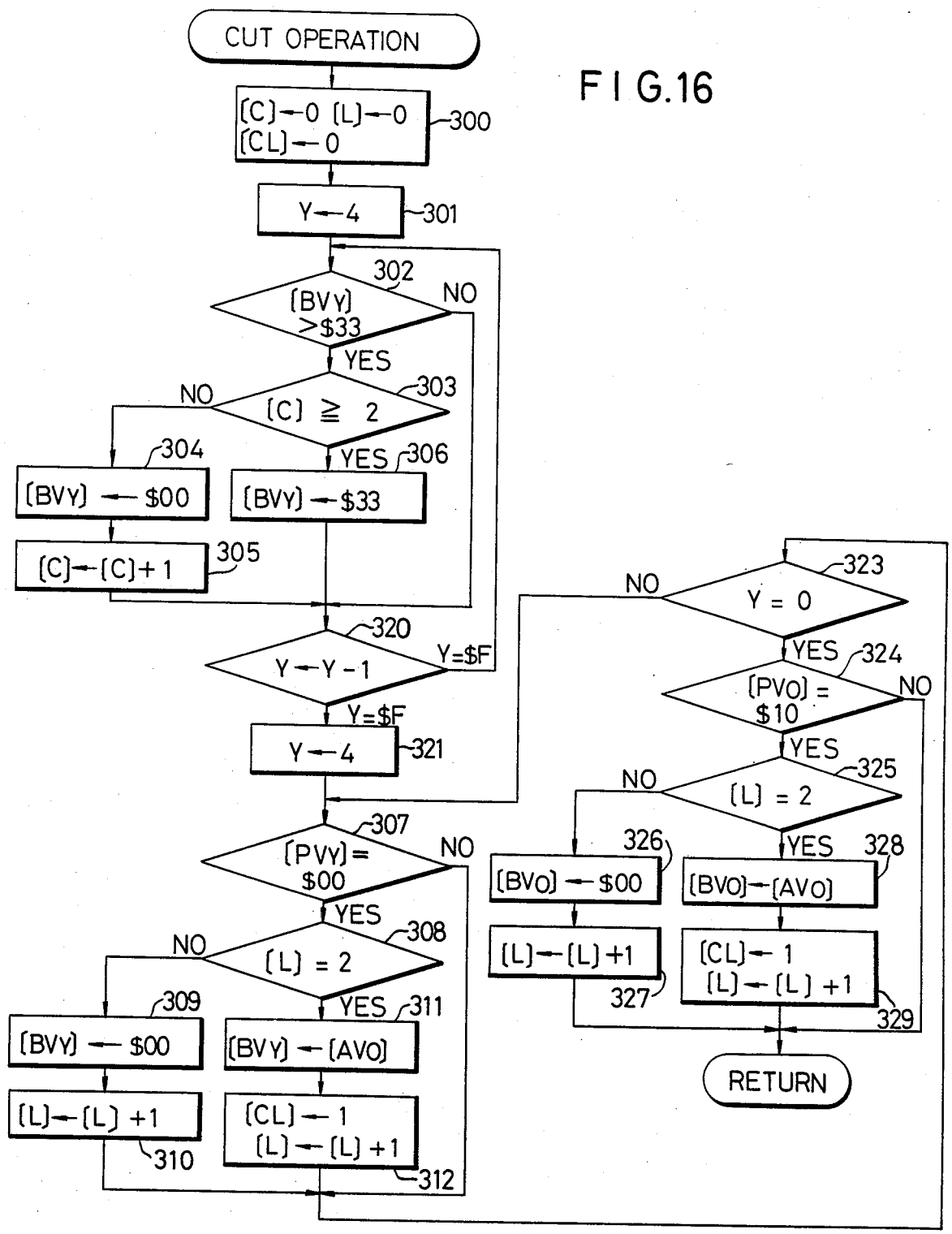
FIG. 16 is a flow chart of the sub-routine for another cut-operation.

FIG. 16 shows a modification of the cut operation sub-routine shown in FIG. 15.

In this modification, the lower threshold for the cut operation regarding Vo (corresponding to the central zone Zo in FIGS. 1A and 1B) is set to a level higher than that for PV1 to PV4 (corresponding to zones Z1 to Z4). The reason for this is that generally the central zone Zo near the optical axis has a higher luminance than the marginal zones Z1 to Z4 apart away the optical axis and that as shown in FIG. 3 there are used two photo-diodes to measure the central zone Zo. In this embodiment, the lower threshold set for PVo is $10.

Steps 300 to 312 in FIG. 16 correspond to those in FIG. 15 with the exeption that Steps 320 and 321 corresponding to the Steps 313 and 301 in FIG. 15 are inserted between Steps 306 and 307. Cut operations for PV1 to PV4 are carried out at steps previous to Step 323. After verifying Y=0 at Step 323, PVo is compared to the threshold $10 at Step 324 and the cut operation regarding PVo is carried out. Step 325 in FIG. 16 corresponds to Step 308 in FIG. 15. Steps 326 and 328 correspond to Steps 309 and 311 with only the change that $BV_Y$ is replaced by BVo. Steps 327 and 329 correspond to Steps 310 and 312 above shown in FIG. 15.

The above embodiments of the invention have many advantages over the prior art. According to the embodiment shown in FIG. 12 the following advantages can be obtained:

For example, when a lens of F1.4 (AVo is 1[EV]) is mounted, the value of BVo for the photometric output $36 becomes $39 because of the addition of AVo of 1[EV], thereto. In this case, the BVo is cut out according to the formula (24). But, $39 is stored in BVo(*). Therefore, the arithmetic operation according to the formula (17) is possible. Where BVans ($=BV_M$)=$2D, from the formula (17)

$$\Delta \leftarrow \$F4 \leftarrow \$2D - \$39.$$

$F4 is a value corresponding to −4[EV]. Accordingly, the exposure can be controlled in such manner as to give an exposure corrected toward the over-exposure side by 4[EV] relative to the photometric output of the central zone.

According to the embodiment shown in FIG. 13 the following advantages can be obtained:

Again it is assumed that a lens of F1.4 is mounted on the camera. When the output PVo is $3F, the operation according to the formula (19) is carried out. The correction value obtained by it is:

$$\Delta = -(4 + AVo) = -5 \quad (31)$$

Similarly, for a lens of F2.8 (AVo=3), the correction value Δ obtained thereby is −7. In this manner, where the photometric output reaches the upper limit for measurement, the exposure control is so carried out as to correct it toward one and the same luminance value. If the output exceeds the upper limit further, the luminance value for exposure is controlled by a certain constant correction value Δ. Therefore, as compared with the case where the control is carried out merely by the output of the central zone (Δ=0), the exposure is always corrected toward the over-exposure side by the above control. This brings forth an advantage that the effect of multi-pattern metering can be maintained well.

In contrast, according to the embodiment shown in FIG. 12, when the central zone output PVo is $3F, the value of BVo(*) for a lens of F1.4 [AVo]=$03) becomes $42. Therefore, the correction value is:

$$\Delta = BV_M - \$42.$$

Since $BV_M$ can not be larger than $33 because of the cut operation according to the formula (43), the correction value Δ becomes:

$$\$33 - \$42 = \$F1 \ (= -\$F),$$

which correction value is over −5[EV]. Although −5[EV] is a value corresponding to the correction value according to the formula (31'), there may be given a correction value over 5[EV] according to the value of $BV_M$. This means the increasing of unstable factors for the upper limit. In this respect, a more stable control can be realized according to FIG. 13 embodiment in which the correction value is constant.

Referring again to FIG. 13, the correction value is 0 when the central zone output is under the lower limit for measurement. The reason for this is the same as described above. As previously shown, two photodiodes are provided for measuring the central zone and the area of the central zone is broader than the peripheral zone. Therefore, when the output from the central zone is under the lower limit for measurement, it is reasonable that the exposure control is carried out merely by the output of the central zone without correction.

Obviously many modifications and variations of the present invention are possible in the light of the above teachings. It is therefore to be understood that within the scope of the appended claims the invention may be practiced otherwise than as specifically described.

I claim:

1. A camera having means for measuring light from an object passed through a diaphragm aperture of a phototaking lens and generating a measuring output, means for setting a film sensitivity, means for stopping down said diaphragm aperture and means for controlling a shutter, the camera comprising:
   (a) operating means for effecting an operation for obtaining a shutter speed in accordance with said set film sensitivity and said measuring output when said stopping down means has completed stopping down the diaphragm aperture;
   (b) means for detecting that a brightness indicated by said measuring output before stopping down of said aperture by said stopping down is outside of a predetermined range and generating a detection signal; and
   (c) correcting means for controlling said operating means in response to said detection signal to correct the shutter speed obtained by said operating means.

2. A camera according to claim 1, wherein said correcting means include means for supplying an amount to be corrected to said operating means in response to said detection signal.

3. A camera according to claim 2, wherein said camera further comprises means for detecting a fully open aperture value of said phototaking lens and generating a fully open aperture value signal indicative of said detected fully open aperture value, said supplying means supplying said amount to be corrected in accordance with said fully open aperture value.

4. A camera according to claim 2, wherein said operating means effects the operation in accordance with the brightness indicated by the measuring output before stopping down the diaphragm aperture by the stopping down means and the set film sensitivity.

5. A camera according to claim 1, wherein said detecting means detects that the level of the brightness indicated by said measuring output is above a predetermined level.

6. A camera according to claim 5, wherein said correcting means controls said operating means in response to said detection signal to obtain a shutter speed which is later than that obtained before correction by the correcting means.

7. A camera having means for measuring light from an object passed through a diaphragm aperture of a phototaking lens and generating a measuring output, means for setting a film sensitivity and means for stopping down said diaphragm aperture; the camera comprising:
   (a) means for controlling said stopping down means to stop down the diaphragm aperture to an aperture value according to said measuring output and said film sensitivity;
   (b) detection means for detecting that a brightness indicated by said measuring output before stopping down the diaphragm aperture by said stopping down means is outside of a predetermined range and generating a detection signal; and
   (c) correcting means for controlling said controlling means in response to said detection signal to correct the aperture value of said diaphragm aperture stopped down by said stopping down means.

8. A camera according to claim 7, wherein said correcting means supplies an amount to be corrected to said controlling means in response to said detection signal.

9. A camera according to claim 8, wherein said controlling means includes means for forming a reference signal in accordance with said set film sensitivity and the amount to be corrected, and means for comparing said reference signal and said measuring output.

10. A camera according to claim 8, wherein said camera further comprises means for detecting a fully open aperture value of the phototaking lens and generating a fully open aperture value signal indicative of the detected fully open aperture value, said supplying means supplying said amount to be corrected in accordance with said fully open aperture value signal.

11. A camera according to claim 8, wherein said camera further comprises means for setting a shutter speed, said control means including means for forming a reference signal according to said set film sensitivity, said set shutter speed and said amount to be corrected, and means for comparing said reference signal and said measuring output.

12. A camera according to claim 7, wherein said detecting means detects that the level of brightness indicated by said measuring output is above a predetermined level.

13. A camera according to claim 12, wherein said correcting means controls said control means in response to said detection signal so that aperture value of said diaphragm aperture stopped down by said stopping down means may be smaller than the aperture value obtained before correction by said correcting means.

14. A camera having light-measuring means dividing an object field into a plurality of zones and measuring lights from said plurality of zones, and effecting exposure control in accordance with a plurality of light-measuring outputs from said light-measuring means corresponding to said plurality of zones, the camera comprising:
   (a) detecting means for sequentially detecting that each brightness value indicated by said respective plurality of light-measuring outputs is outside of a predetermined range and generating a first detection signal each time detection is made.

(b) counter means for counting the number of said generated first detection signals and generating a second detection signal when the counted number reaches a determined number;
(c) operating means;
(d) inputting means for inputting a plurality of brightness values indicated by said plurality of light-measuring outputs to said operating means;
(e) said operating means carrying out operation for exposure control in accordance with said plurality of brightness values input by said inputting means;
(f) means for impeding said inputting means from inputting the detected brightness value to said operating means, in response to said first detection signal; and
(g) said inputting means inputting a predetermined value to said operating means in response to said second detection signal, and said operating means operating said light-measuring outputs and said predetermined value input by said inputting means.

15. A camera according to claim 14, wherein said inputting means inputting said predetermined value to said operating means each time the first detection signal is generated, after said second detection signal has been generated.

16. A camera according to claim 14, wherein said detecting means sequentially compares said plurality of brightness values with a predetermined level and generates said first detection signal when the brightness value is above the predetermined level.

17. A camera according to claim 14, further comprising:
another counter means for counting the number of said generated first detection signals and generating a third signal when the counted number reaches another predetermined number which is greater than said predetermined number.

18. A camera according to claim 17, wherein said inputting means stops inputting said predetermined value to said operating means, in response to said third detection signal.

19. A camera according to claim 18, wherein said detecting means sequentially compares the respective plurality of brightness values with a predetermined level and generates said first detection signal when brightness value is below said predetermined level.

20. A camera having light-measuring means for dividing an object field into a plurality of zones and measuring lights transmitted through a diaphragm aperture from said plurality of zones, operating means for effecting an operation for obtaining brightness values in accordance with a plurality of outputs from the light-measuring means corresponding to the plurality of zones, and means for stopping down the diaphragm aperture, the camera comprising:
(a) detecting means for detecting that each brightness value idicated by the respective plurality of light-measuring outputs is outside of a predetermined range, before the aperture stop is stopped down by said stopping means, and generating a detection signal;
(b) inputting means for inputting the respective brightness values indicated by the plurality of measuring outputs to said operating means;
(c) means for impeding the detected brightness from being inputted to said operating means by said inputting means, in response to said detection signal;
(d) memory means for memorizing brightness value indicated by at least one light-measuring output among said plurality of light-measuring outputs, before said aperture stop is stopped down; and
(e) exposure control means for controlling exposure in accordance with difference between the brightness value memorized in said memory means and the brightness value effected by said operating means.

21. A camera according to claim 20, wherein said exposure control means controls exposure time in accordance with said difference.

22. A camera according to claim 20, wherein said exposure control means controls said stopping down means in accordance with said difference.

23. A camera having light-measuring means for dividing an object field into a plurality of zones and measuring lights from said plurality of zones, exposure control being effected in accordance with a plurality of light-measuring outputs from said light-measuring means corresponding to said plurality of zones, the camera comprising:
(a) detecting means for detecting that the brightness value indicated by each light-measuring output is outside of a predetermined range and generating a first detection signal, the detecting means further generating a second detection signal, the detecting means further generating a second detection signal when the number of the detected brightness values is more than a predetermined number;
(b) operating means;
(c) inputting means for inputting a plurality of brightness values indicated by said plurality of light-measuring outputs to said operating means;
(d) said operating means effecting an operation for exposure control in accordance with said plurality of brightness values input by said inputting means;
(e) means for impeding said inputting means from inputting the detected brightness values to said operating means, in response to said first detection signal;
(f) said inputting means inputting a predetermined value to said operating means in response to said second detection signal; and
(g) said operating means effecting an operation in accordance with said light-measuring output and said predetermined value input by said inputting means.

* * * * *